(12) United States Patent
Jernigan, IV (10) Patent No.: US 8,005,793 B1
(45) Date of Patent: Aug. 23, 2011

(54) RETAINING PERSISTENT POINT IN TIME DATA DURING VOLUME MIGRATION

(75) Inventor: Richard P. Jernigan, IV, Ambridge, PA (US)

(73) Assignee: NetApp, Inc., Sunnyvale, CA (US)

( * ) Notice: Subject to any disclaimer, the term of this patent is extended or adjusted under 35 U.S.C. 154(b) by 1028 days.

(21) Appl. No.: 11/406,109

(22) Filed: Apr. 18, 2006

(51) Int. Cl.
*G06F 17/00* (2006.01)
(52) U.S. Cl. ......... 707/639; 707/646; 707/649; 707/660
(58) Field of Classification Search .............. 707/10, 707/104.1, 204, 999.001, 999.201, 999.204, 707/610, 616, 624, 639, 646, 649, 660, 686
See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 6,629,203 B1 * | 9/2003 | Humlicek | 711/114 |
| 7,096,330 B1 * | 8/2006 | Root et al. | 711/162 |
| 7,389,394 B1 * | 6/2008 | Karr et al. | 711/162 |
| 7,451,168 B1 * | 11/2008 | Patterson | 707/999.104 |
| 7,454,445 B2 * | 11/2008 | Lewis et al. | 707/999.1 |
| 7,620,666 B1 * | 11/2009 | Root et al. | 707/204 |
| 7,707,183 B2 * | 4/2010 | Alstrin et al. | 707/639 |
| 7,840,536 B1 * | 11/2010 | Ahal et al. | 707/648 |
| 2001/0028368 A1 * | 10/2001 | Swartz et al. | 345/835 |
| 2002/0083037 A1 * | 6/2002 | Lewis et al. | 707/1 |
| 2002/0174416 A1 * | 11/2002 | Bates et al. | 717/128 |
| 2003/0182326 A1 * | 9/2003 | Patterson | 707/204 |
| 2004/0030846 A1 * | 2/2004 | Armangau et al. | 711/154 |
| 2004/0030951 A1 * | 2/2004 | Armangau | 714/6 |
| 2005/0010618 A1 * | 1/2005 | Hayden | 707/204 |
| 2005/0033929 A1 * | 2/2005 | Burton et al. | 711/162 |
| 2005/0262377 A1 * | 11/2005 | Sim-Tang | 714/1 |
| 2006/0064687 A1 * | 3/2006 | Dostert | 718/1 |
| 2006/0294351 A1 * | 12/2006 | Rostampour | 713/1 |
| 2008/0005468 A1 * | 1/2008 | Faibish et al. | 711/114 |
| 2008/0216054 A1 * | 9/2008 | Bates et al. | 717/125 |
| 2009/0177718 A1 * | 7/2009 | Patterson et al. | 707/204 |
| 2009/0265516 A1 * | 10/2009 | Prabhu et al. | 711/161 |
| 2009/0276593 A1 * | 11/2009 | Jacobson et al. | 711/162 |
| 2010/0174682 A1 * | 7/2010 | Alstrin et al. | 707/649 |
| 2011/0066897 A1 * | 3/2011 | Bumgarner et al. | 714/46 |

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.
Bitton, Dina, *Disk Shadowing*, Proceedings of the 14$^{th}$ VLDB Conference, LA, CA 1988.
Chaudhuri, Surajit, et al., *Self-Tuning Technology in Microsoft SQL Server*, Data Engineering Journal Feb. 22, 1999 pp. 20-27.

(Continued)

*Primary Examiner* — Charles Rones
*Assistant Examiner* — Rezwanul Mahmood
(74) *Attorney, Agent, or Firm* — Cesari and McKenna, LLP (57) ABSTRACT

Provided is a method and system for performing volume migrations while retaining persistent point in time data of the migrated volume. Specifically, by using a collective persistent point in time data map that describes a collection of persistent point in time data of a volume to be migrated, the collective persistent point in time data map and volume data can be migrated during a quiesced period of user activity. Then, during a non-quiesced period of user activity, the persistent point in time data can be transferred to the location of the migrated volume in real-time.

22 Claims, 9 Drawing Sheets

OTHER PUBLICATIONS

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87/1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal Feb. 22, 1999 pp. 33-40.

Kent, Jack et al., *Optimizing Shadow Recovery Algorithms, IEEE Transactions on Software Engineering*, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104 .

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal Feb. 22, 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal Feb. 22, 1999 pp. 41-47.

Sidebotham, Bob, *Volumes. The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal Feb. 22, 1999 pp. 28-32.

Weikum, Gerhard, et al., *Towards Self-Tuning Memory Management for Data Servers*, Data Engineering Journal Feb. 22, 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview Transarc Corporation, Pittsburgh, PA, 1.0 edition 1991.

\* cited by examiner

RETAINING PERSISTENT POINT IN TIME DATA DURING VOLUME MIGRATION

TECHNICAL FIELD

Embodiments of the present invention relate to storage systems, and in particular, to transferring volumes between storage systems.

BACKGROUND

A storage system can retain persistent point in time data to enable the quick recovery of data after data has perhaps been corrupted, lost, or altered. For example, a user accessing a document file may alter the document, save the document file, and later have remorse that the document should not have been altered. To recover the unaltered document, the user may access or be given access to persistent point in time data of the unaltered document by a storage system, administrator. Exemplary persistent point in time data is stored in a Snapshot™, available in technology offered by Network Appliance Inc., of Sunnyvale Calif.

When transferring logically organized data between two storage systems, such as data logically organized in volumes, persistent point in time data and current versions of the data can be transferred between the storage systems. However, during the transfer of volumes between the storage systems, transferring all persistent point in time data may increase the time to perform the data migration, thus causing one or both of the storage systems to be unavailable for user access. Further, data migration of volumes between multiple storage systems may cause more than two systems to be unavailable.

A solution to increase the availability of the storage systems during data migration is to transfer a portion of the persistent point in time data, thus reducing the time users have no access to the storage systems. However, this is not an optimal solution because persistent point in time data that are not migrated may be needed. For example, if the migrated current versions of the data and the migrated persistent point in time data do not contain the unaltered data sought by a user, then the user may become dissatisfied.

Accordingly, what is needed is a method and system to provide high availability of storage systems during data migration while retaining all persistent point in time data.

SUMMARY

Embodiments of the present invention provide a method and a system for retaining all persistent point in time data during volume migration. In one exemplary embodiment, a storage system can organize data in logical constructs called volumes. Further, the volumes are stored on a collection of disks that is accessible by the storage system. Associated with each volume is persistent point in time (PPT) data, which provides read-only access to data organized by the volume. Thus, data stored on the disks can be perceived as being a collection of current data and PPT data. Such data includes, for example, a document written by a user to the disks.

During the operation of a group of storage systems, such as storage systems organized as a clustered computing environment, it may become necessary to transfer a volume from one storage system to another storage system, or to transfer a volume within one storage system. Such migrations of volumes between storage systems can be performed reliably and with minimal storage system unavailability with the use of a collective PPT data map, which is a logical organization of all the PPT data associated with a volume. By transmitting a volume and the collective PPT data map from a source storage system to a destination storage system, user access to data is minimally impacted.

For example, in an embodiment of a method for transferring data between a first system and a second system, the method includes logically comparing a plurality of PPT data maps of the first system and identifying a collective persistent point in time data map. Further, the method includes transmitting the collective persistent point in time data map from the first system to the second system, such that the second system implements a policy. The method also permits the transfer of control from the first system to the second system, such that data requests to access data stored on the first system are handled by the second system.

In an exemplary embodiment of a clustered system, the clustered system includes a first node that is configured to store a volume to be migrated. Further, the clustered system includes a second node that is configured to store the migrated volume, such that the second node includes a collective persistent point in time data map for the migration of persistent point in time data from the first node to the second node.

Alternatively, in an embodiment of a system for retaining data during a volume migration, the system includes a memory module that is configured to store a collective persistent point in time data map. The system also includes means for preventing a block allocation on a target storage system that would conflict with a block transfer from a source storage system.

Further, in an embodiment of a computer readable media containing instructions for execution on a processor for the practice of retaining persistent point in time data during a volume migration from a source volume to a target volume, the embodiment includes determining a collective persistent point in time data map. The embodiment also implements a policy while referencing the collective persistent point in time data map and permits access to data of the target volume while transferring persistent point in time data from the source volume to the target volume.

Other aspects of the invention will become apparent from the following detailed description taken in conjunction with the accompanying drawings, which illustrates by way of example, the principles of the invention.

DETAILED DESCRIPTION

A storage system can organize data in logical constructs called volumes. Further, the volumes are stored on a collection of disks that is accessible by the storage system. Associated with each volume is persistent point in time (PPT) data, which provides read-only access to data organized by the volume. Thus, data stored on the disks can be perceived as being a collection of data and PPT data. Data includes, for example, a document written by a user to the disks. During the operation of a group of storage systems, such as storage systems organized as a clustered computing environment, it may become necessary to transfer a volume from one storage system to another storage system. Such migrations of volumes between storage systems can be performed reliably and with minimal storage system unavailability with the use of a collective PPT data map, which is a logical organization of all the PPT data associated with a volume. By transmitting a volume and the collective PPT data map from a source storage system to a destination storage system, user access to data is minimally impacted. Further details describing the transfer of PPT data, which retains PPT data instead of discarding PPT data during volume migration are hereinafter described.

Distributed Storage System

Figure 1:
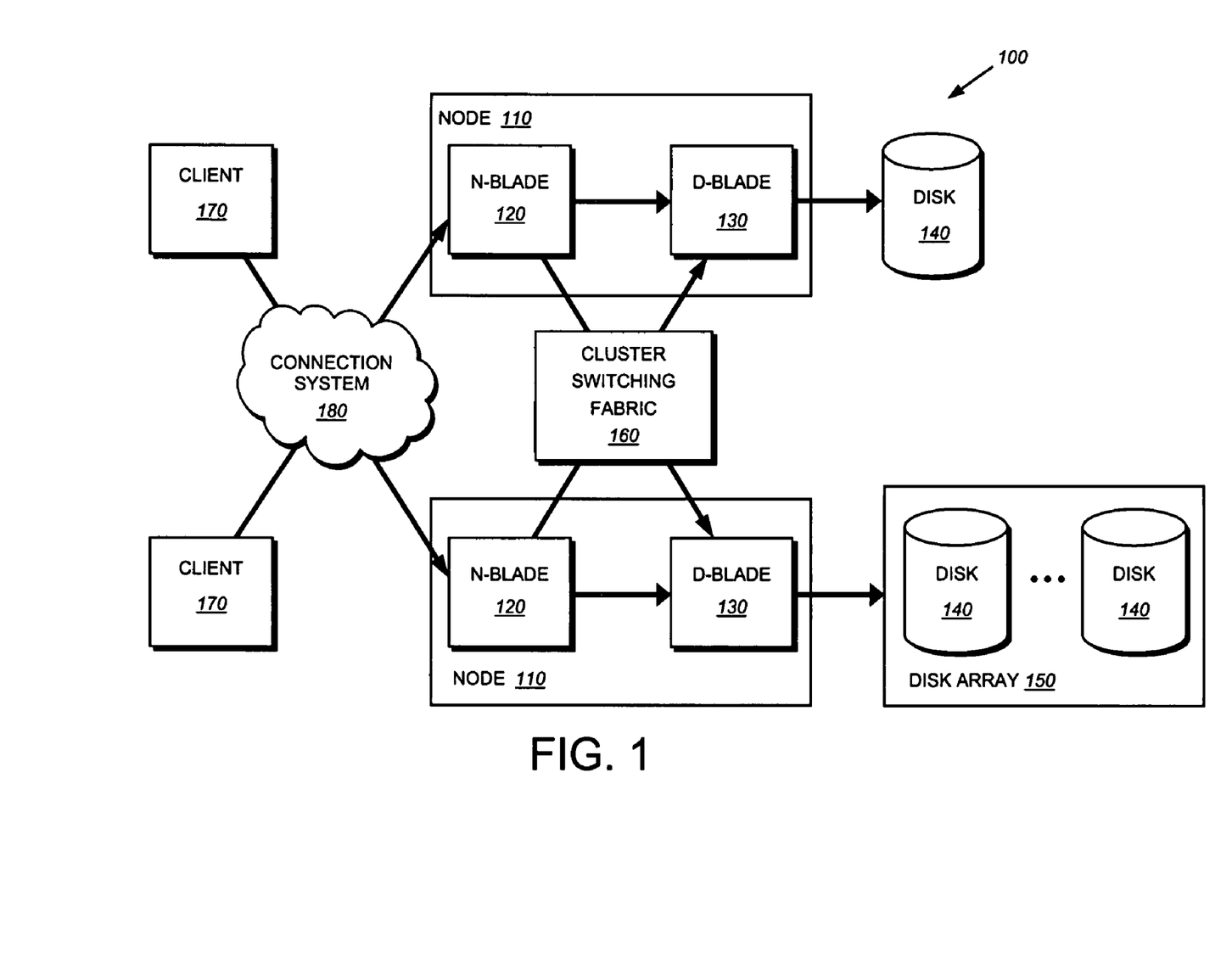
FIG. 1 is a diagram illustrating a cluster having a plurality of nodes capable of migrating volumes, in accordance with an embodiment of the invention.

In accordance with an embodiment of the invention, FIG. 1 is a diagram illustrating a cluster 100 having a plurality of nodes 110 capable of migrating volumes. The nodes 110 comprise various functional components that cooperate to provide a distributed storage system architecture. To that end, each node 110 is generally organized as a network element (N-blade, or N-module 120) and a disk element (D-blade, or N-module 130). The N-module 120 includes functionality that enables the node 110 to connect to clients 170 over a connection system 180, while each D-module 130 connects to one or more storage devices, such as disks 140 or a disk array 150. The nodes 110 are interconnected by a cluster switching fabric 160 which, in the illustrative embodiment, may be embodied as a Gigabit Ethernet switch. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a configuration of a cluster 100 that does not reflect a one-to-one correspondence between the N and D-modules. As such, the description of a node 110 comprising one N-module and one D-module should be taken as illustrative only.

The clients 170 may be general-purpose computers configured to interact with the node 110 in accordance with a client/server model of information delivery. For example, interaction between the clients 170 and nodes 110 can enable the provision of storage services. That is, each client 170 may request the services of the node 110, and the node 110 may return the results of the services requested by the client 170, by exchanging packets over the connection system 180, which may be a wire-based or wireless communication system. The client 170 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client 170 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Figure 2:
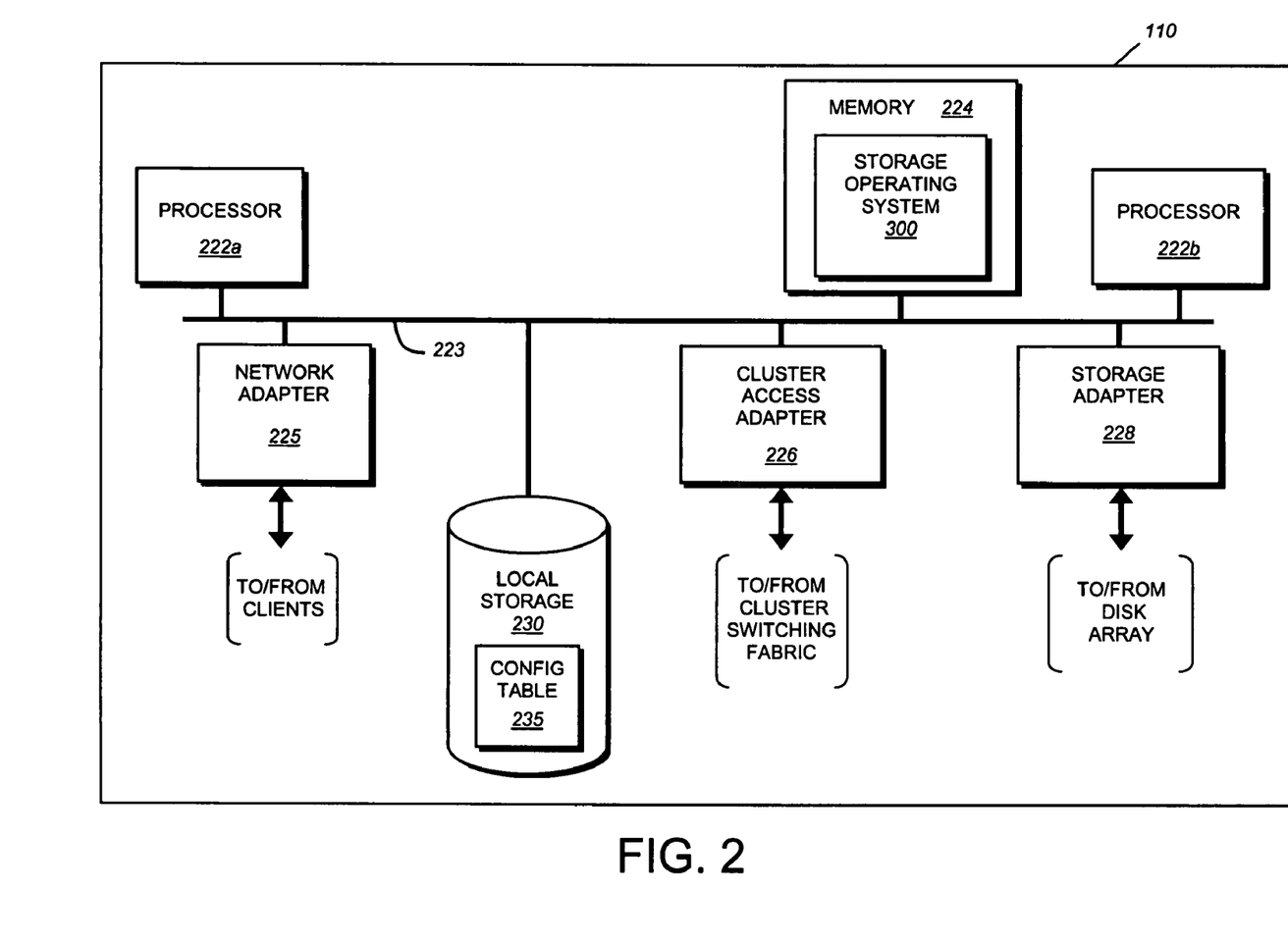
FIG. 2 is a diagram illustrating a node of the cluster, in accordance with an embodiment of the invention.

FIG. 2 is a diagram illustrating the node 110 of the cluster 100, in accordance with an embodiment of the invention. Specifically, the node 110 is illustratively embodied as a storage system comprising a plurality of processors $222a,b$, a memory 224, a network adapter 225, a cluster access adapter 226, a storage adapter 228 and local storage 230 interconnected by a system bus 223. The local storage 230 comprises one or more storage devices, such as disks 140, utilized by the node 110 to locally store configuration information (e.g., in configuration table 235) provided by one or more management processes. The cluster access adapter 226 comprises a plurality of ports adapted to couple the node 110 to other nodes 110 of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 110 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 110 may alternatively comprise a single or more than two processor system. Illustratively, one processor $222a$ can execute the functions of the N-module 310 on the node, while the other processor $222b$ can execute the functions of the D-module 350. It should also be appreciated that processors $222a,b$ may include multiple processing cores, thus improving the processing speed of the processors $222\ a,b$.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 110 by, inter alia, invoking storage operations in support of the storage service implemented by the node 110. It will be apparent to those skilled in the art that other processing and memory means, including various computer readable media, may be used for storing and executing program instructions pertaining to the invention described herein.

The network adapter 225 comprises a plurality of ports adapted to couple the node 110 to one or more clients 170 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the connection system 180 may be embodied as an Ethernet network or a Fibre Channel (FC) network. Each client 180 may communicate with the node 110 over the connection system 180 by exchanging discrete frames or packets of data according to pre-defined protocols, such as TCP/IP.

The storage adapter 228 cooperates with the storage operating system 300 executing on the node 110 to access information requested by the clients 170. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 140 of the disk array 150. The storage adapter 228 comprises a plurality of ports having input/output (I/O) interface circuitry that couples to the disks over an I/O interconnect arrangement, such as a conventional high-performance, FC link topology.

In accordance with an exemplary embodiment of the present invention, storage of information on each disk array 150 is preferably implemented as one or more storage "volumes" 310 (FIG. 3) that comprise a collection of physical storage disks 140 cooperating to define an overall logical arrangement of volume block number (vbn) space on the volume(s). Each logical volume is generally, although not necessarily, associated with its own file system. The disks 140 within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Storage Operating System

Figure 3:
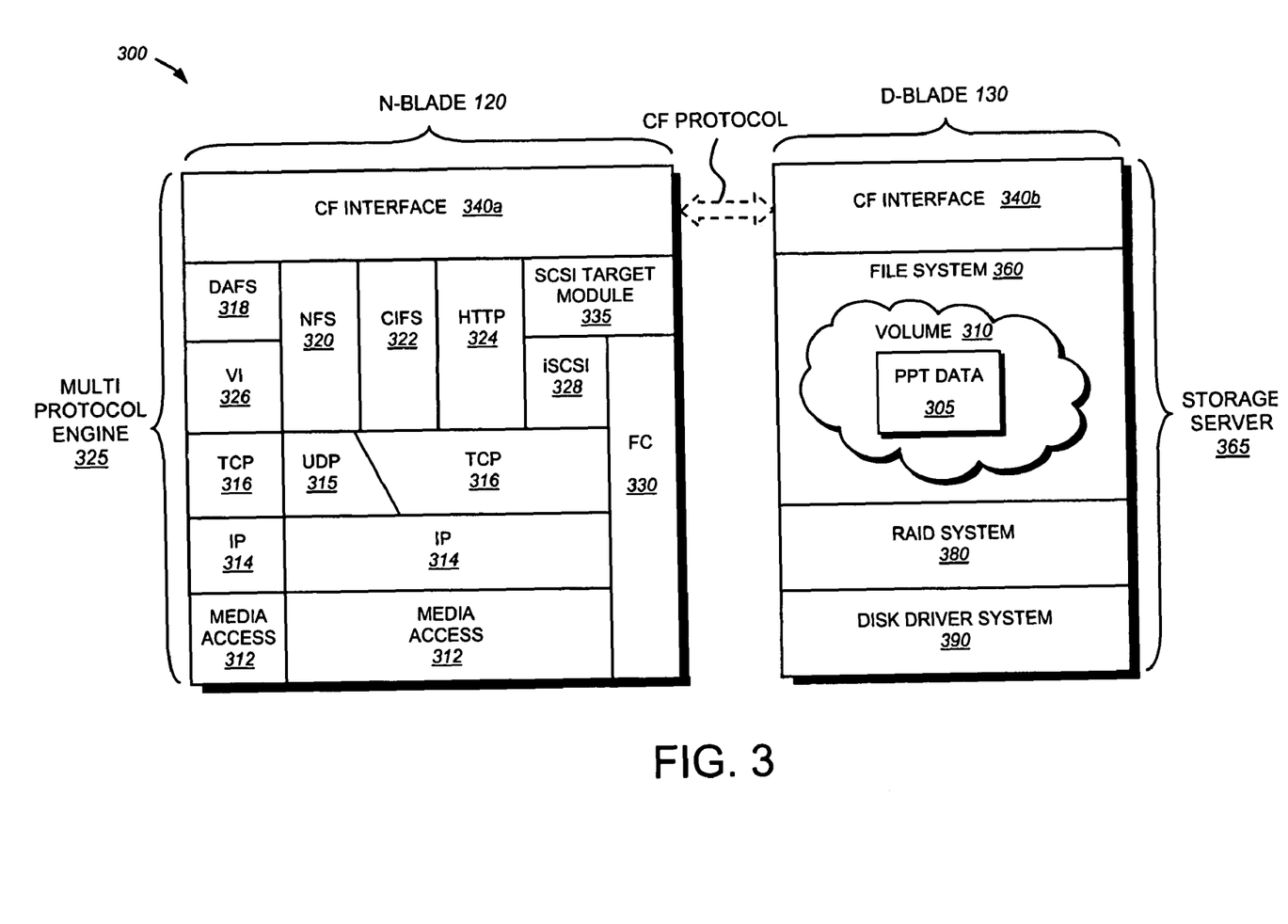
FIG. 3 is a diagram further illustrating a storage operating system capable of volume migration, in accordance with an embodiment of the invention.

To facilitate access to the disks 140, the storage operating system 300 of FIG. 3 implements a write-anywhere file system that cooperates with one or more virtualization modules to "virtualize" the storage space provided by the disks 140. A file system 360 logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment; the storage operating system 300 is preferably the NetApp® Data ONTAP® operating system available from Network Appliance Inc., of Sunnyvale, Calif., that implements a Write Anywhere File Layout (WAFL®) file system. However, it is expressly contemplated that any appropriate storage operating system may be enhanced for use in accordance with the inventive principles described herein. As such, the storage operating system 300 should be taken broadly to refer to any storage operating system that is otherwise adaptable to the teachings of this invention.

FIG. 3 is a diagram further illustrating a storage operating system 300 capable of volume migration, in accordance with an embodiment of the invention. The storage operating system 300 comprises a series of software layers organized to form an integrated network protocol stack or, more generally, a multi-protocol engine 325 that provides data paths for clients 170 to access information stored on the node 110 using block and file access protocols. The multi-protocol engine 325 includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. A iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 110.

In addition, the storage operating system 300 includes a series of software layers organized to form a storage server 365 that provides data paths for accessing information stored on the disks 130 of the node 200. To that end, the storage server 365 includes a file system module 360 for managing volumes 310, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. A volume 310 includes zero or more persistent point in time (PPT) data 305. The PPT data 305 are read-only data that are point in time references to the volume's data (e.g. an hour ago, week ago, month age, etc.). PPT data 305 cannot be modified and can be deleted, thus providing a "snapshot" or a history of data.

It should be appreciated that in some exemplary embodiments, the "snapshot" is based on technology offered by Network Appliance Inc. of Sunnyvale, Calif. Alternative embodiments may implement a logical volume manager that use copy-on-write methods that permit the creation of persistent point in time data of block-accessible devices, such as disks. Such technology regarding copy-on-write methods are contemplated by exemplary embodiments of the present invention, for which the details are well known to those of ordinary skill in the art.

When migrating volumes 310 and PPT data 305 between nodes 110, the transfer of multiple PPT data 305 can cause node 110 unavailability during the migration. However, by utilizing a PPT data map that collectively describes multiple PPT data 305 during the volume migration, node 110 unavailability can be minimized. Further details regarding the transfer of volumes, the PPT data map, and PPT data are described with reference to FIGS. 6 through 8C.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (not shown), in response to a user (system administrator) issuing commands to the node 110. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks 140. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 170 is forwarded as a packet over the connection system 180 and onto the node 110 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 140 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 140 and loads the requested data block(s) in memory for processing by the node. Upon completion of the request, the node 110 (and operating system) returns a reply to the client 170 over the connection system 180.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 110 in response to a request issued by the client 170. Moreover, in another alternate embodiment of the invention, the processing elements of adapters 225, 228 may be configured to offload some or all of the packet processing and storage access operations, respectively, from processor 222, to thereby increase the performance of the storage service provided by the node 110. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 110, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

In an illustrative embodiment, the storage server 365 is embodied as D-module 130 of the storage operating system 300 to service one or more volumes of the disk array 150. In addition, the multi-protocol engine 325 is embodied as N-module 120 to (i) perform protocol termination with respect to a client issuing incoming data access request packets over the connection system 180, as well as (ii) redirect those data access requests to any storage server 365 of the cluster 100. Moreover, the N-module 120 and D-module 130 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication for data container striping operations.

The protocol layers, e.g., the NFS/CIFS layers and the iSCSI/FC layers, of the N-module 120 function as protocol servers that translate file-based and block based data access requests from clients into CF protocol messages used for communication with the D-module 130. That is, the N-module servers convert the incoming data access requests into file system primitive operations (commands) that are embedded within CF messages by the CF interface module 340 for transmission to the D-modules 130 of the cluster 100. Notably, the CF interface modules 340 cooperate to provide a single file system image across all D-modules 130 in the cluster 100. Thus, any network port of an N-module 120 that receives a client 170 request can access any data container within the single file system image located on any D-module 130 of the cluster 100.

Further to the illustrative embodiment, the N-module 120 and D-module 130 are implemented as separately-scheduled processes of storage operating system 300; however, in an alternate embodiment, the modules may be implemented as pieces of code within a single operating system process. Communication between an N-module 120 and D-module 130 is thus illustratively effected through the use of message passing between the modules although, in the case of remote communication between an N-module 120 and D-module 130 of different nodes, such message passing occurs over the cluster switching fabric 160. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc.

Figure 4:
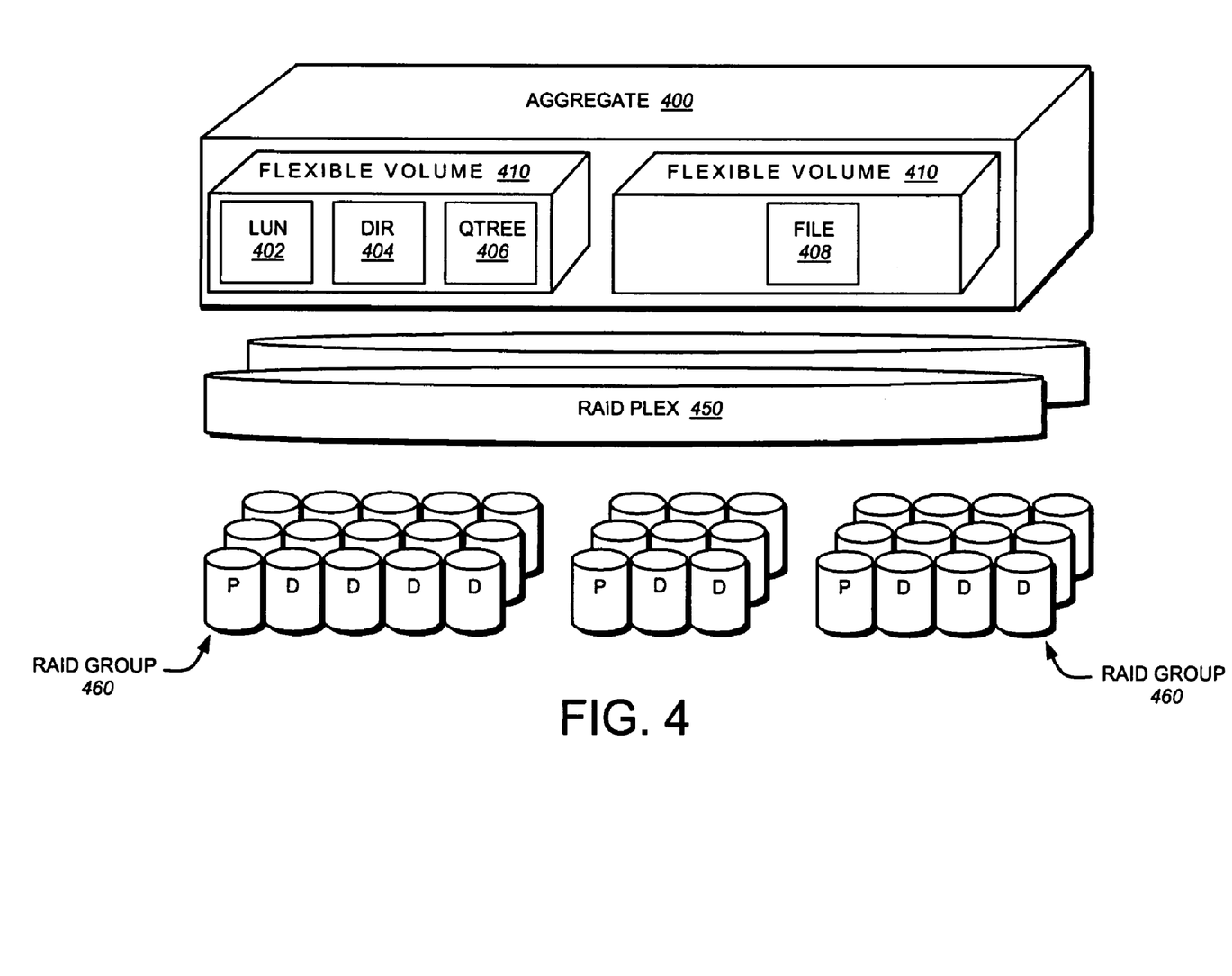
FIG. 4 is a diagram illustrating an aggregate for organizing data in volumes, in accordance with an embodiment of the invention.

FIG. 4 is a diagram illustrating an aggregate 400 for organizing data in volumes, in accordance with an embodiment of the invention. Specifically, the volume 310 of a node 110 can be a flexible volume 410 or a traditional volume. A traditional volume is a collection of specific disks 140 or RAID groups of the disks 140 that are established by a system administrator. A flexible volume is a logical entity that has flexibility in disk 140 or RAID group allocations. Specifically, sizing a flexible volume can occur on the fly, i.e. real-time, thus avoiding possible disk over-allocations, such as over-allocations for traditional volumes that possibly consume more disk space than is needed at any particular point in time. Thus, flexible volume sizes can range, e.g. in Megabytes (MB) or Gigabytes (GB).

In an exemplary embodiment, luns (blocks) 402, directories 404, qtrees 406 and files 408 may be contained within flexible volumes 410, such as dual vbn flexible volumes, that, in turn, are contained within the aggregate 400. The aggregate 400 is illustratively layered on top of the RAID system, which is represented by at least one RAID plex 450 (depending upon whether the storage configuration is mirrored), wherein each plex 450 comprises at least one RAID group 460. Each RAID group further comprises a plurality of disks 430, e.g., one or more data (D) disks and at least one (P) parity disk. Whereas the aggregate 400 is analogous to a physical volume of a conventional storage system, a flexible volume is analogous to a file within that physical volume. That is, the aggregate 400 may include one or more files, wherein each file contains a flexible volume 410 and wherein the sum of the storage space consumed by the flexible volumes is physically smaller than (or equal to) the size of the overall physical volume.

A file, stored as blocks on the disks 140 is readable/writeable, while the PPT data 305 of the file is read-only. Within a volume, the PPT data 305 and the data of the file share the same blocks, i.e. if examining the on disk representation inside a flexible volume, then the metadata of PPT data 305 and the data would point to the same block numbers for storing the data for the file, as further illustrated in FIG. 5. In order to manipulate one of those blocks, e.g. a write operation, the file system 360 allocates a new block, copies the contents from the old block to the new block, modifies the new block and adjusts the file to use the new block for data access.

However, when the file system 360 writes to a block, there is an allocation of a block from somewhere else in the flexible volume. Thus, when a block containing data is modified, a new target block is allocated. Repeated block modifications therefore cause multiple new block modifications. To track the modification of data and the creation of PPT data 305 of the data, the file system 360 can use a volume allocation map and PPT data map, respectively, which are bitmaps representing one bit per block in the flexible volume. For example, a "one" in the bitmap indicates whether the bitmap is using a block in any given time. It should be appreciated that in alternative embodiments, a "zero" can indicate a block in use.

Thus, if a file comprises ten blocks, then the bitmap of the PPT data 305 would illustrate ten bits set to indicate 10 blocks are in use. It should be appreciated that multiple bitmaps exist for multiple PPT data 305. Thus, the multiple bitmap contents indicate which blocks are in use. In an exemplary embodiment of the invention, the PPT data maps are called "snapmaps." Blocks are "freed" and available for allocation, as indicated by the bitmaps, when the data in the blocks are deleted.

Figure 5:
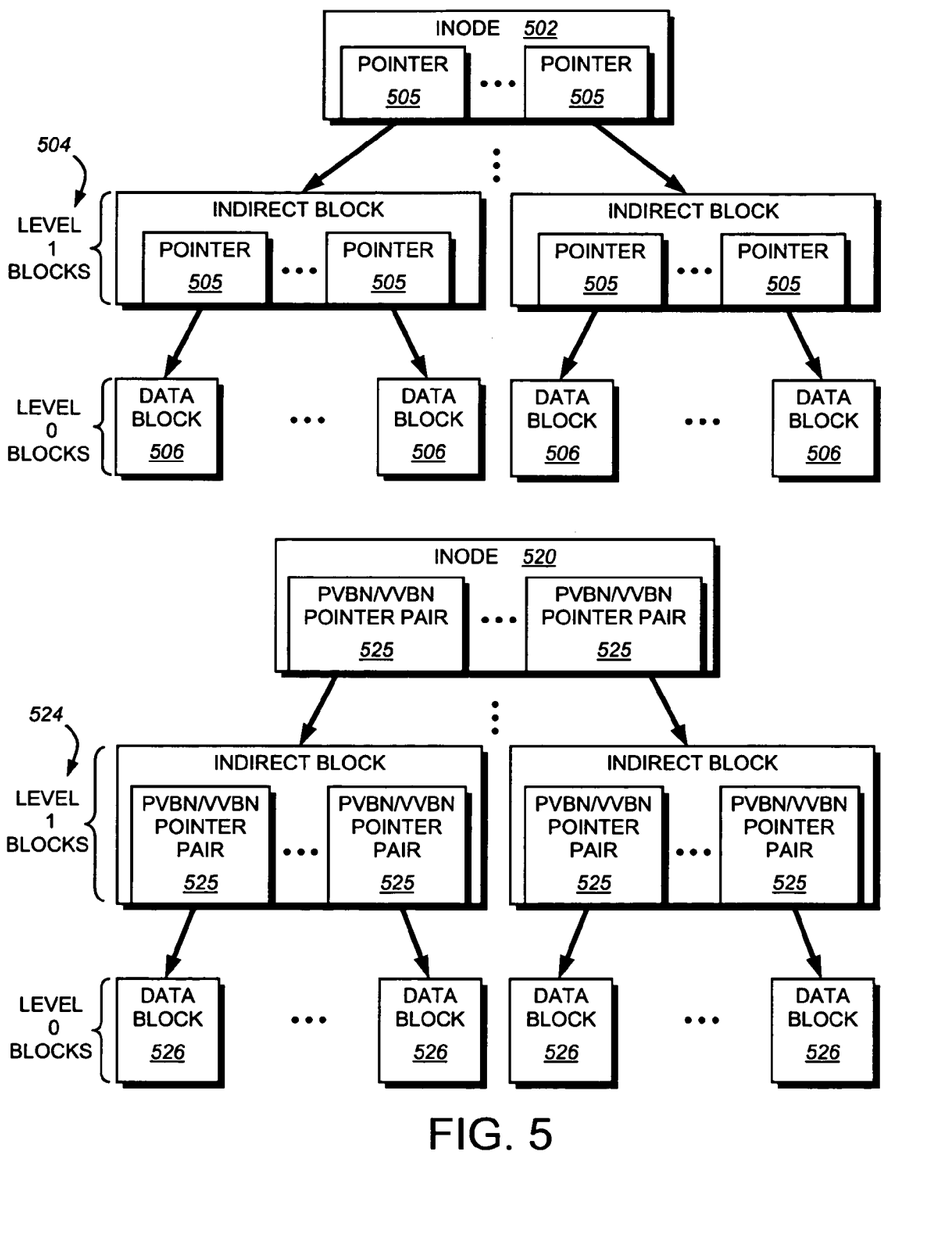
FIG. 5 is a diagram illustrating a buffer tree used in the organization of data, in accordance with an embodiment of the invention.

FIG. 5 is a diagram illustrating a buffer tree used in the organization of data, in accordance with an embodiment of the invention. The buffer tree is an internal representation of blocks for a file (e.g., file 408) loaded into the memory 224 and maintained by the write-anywhere file system 360. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pointers 505 that ultimately reference data blocks 506 used to store the actual data of the file. That is, the data of file 408 are contained in data blocks and the locations of these blocks are stored in the indirect blocks of the file. Each level 1 indirect block 504 may contain pointers to as many as 1024 data blocks. According to the "write anywhere" nature of the file system, these blocks may be located anywhere on the disks 140.

A file system layout is provided that apportions an underlying physical volume into one or more virtual volumes (or flexible volume) of a storage system, such as node 110. In an exemplary embodiment, the underlying physical volume is an aggregate 400 comprising one or more groups of disks, such as RAID groups, of the node 110. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 408) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. For example, in FIG. 5, a root (top-level) inode 520, such as an embedded inode, references indirect (e.g., level 1) blocks 524. Note that there may be additional levels of indirect blocks (e.g., level 2, level 3) depending upon the size of the file. The indirect blocks (and inode) contain pvbn/vvbn pointer pair structures 525 that ultimately reference data blocks 526 used to store the actual data of the file.

The pvbns reference locations on disks of the aggregate 400, whereas the vvbns reference locations within files of the flexible volume. The use of pvbns as block pointers 525 in the indirect blocks 524 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Collective Persistent Point in Time Data Map

Figure 6:
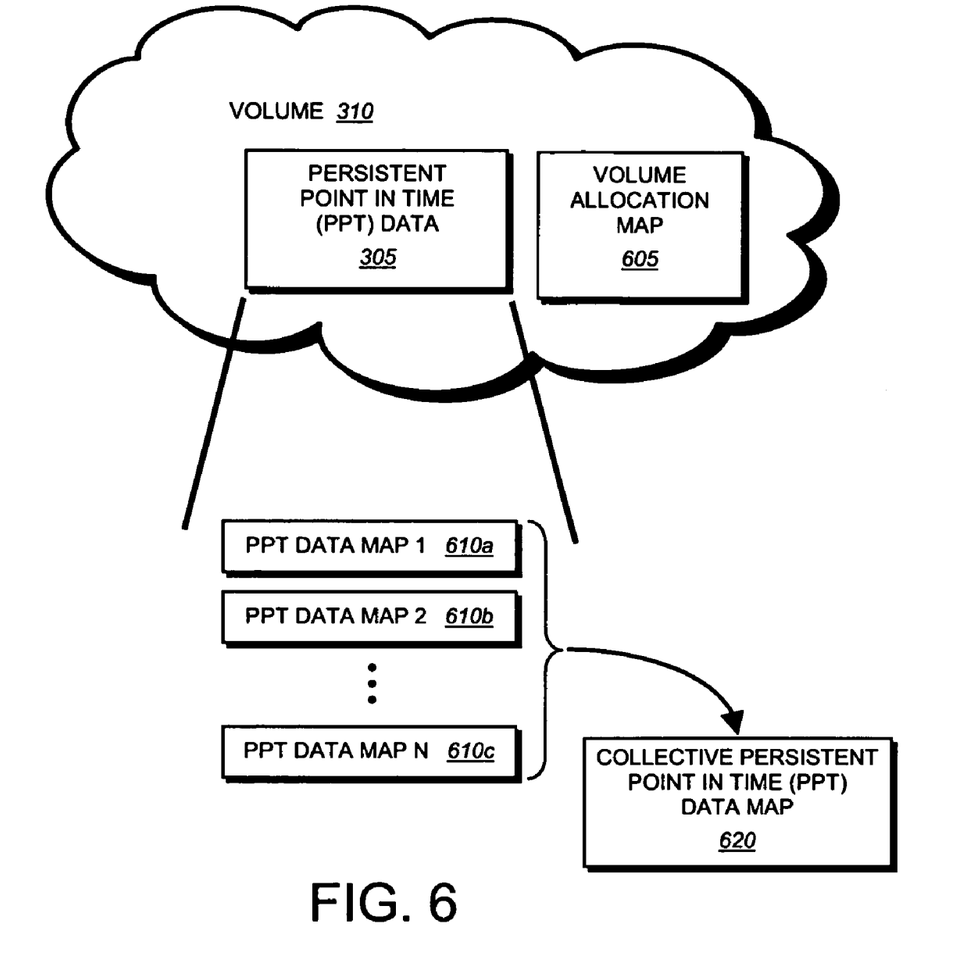
FIG. 6 is a diagram illustrating a collection of persistent point in time (PPT) data, in accordance with an embodiment of the invention.

FIG. 6 is a diagram illustrating a collection of persistent point in time data, in accordance with an embodiment of the invention. Specifically, a volume 310, such as a flexible volume, can include PPT data 305 with a corresponding PPT data map 610 and a volume allocation map 605. The volume allocation map 605 is a bitmap that indicates which blocks are in use or not in use in the volume 310. It should be appreciated that each volume has a corresponding volume allocation map and multiple volume illustrations are not included as to not distract from the inventive aspects of the exemplary embodiments described herein.

As previously described above, the PPT data map 610 performs a similar function of identifying blocks in use or not in use. Grouping the PPT data maps 610 together produces a collective PPT data map 620. For example, the collective PPT data map 620 can be created by performing a logical operation between the existing PPT data maps 610. An exemplary logical operation is a logical "OR" operation, but it should be appreciated that any suitable logical operation for creating the collective PPT data map 620 is possible, as long as the collective PPT data map 620 represents the blocks in use and not in use in the PPT data maps 610. When migrating the volume 310 from a source node 110 to a destination node 110, the collective PPT data map 620 is transferred, along with the volume's current data blocks, without the PPT data maps 610.

Figure 7:
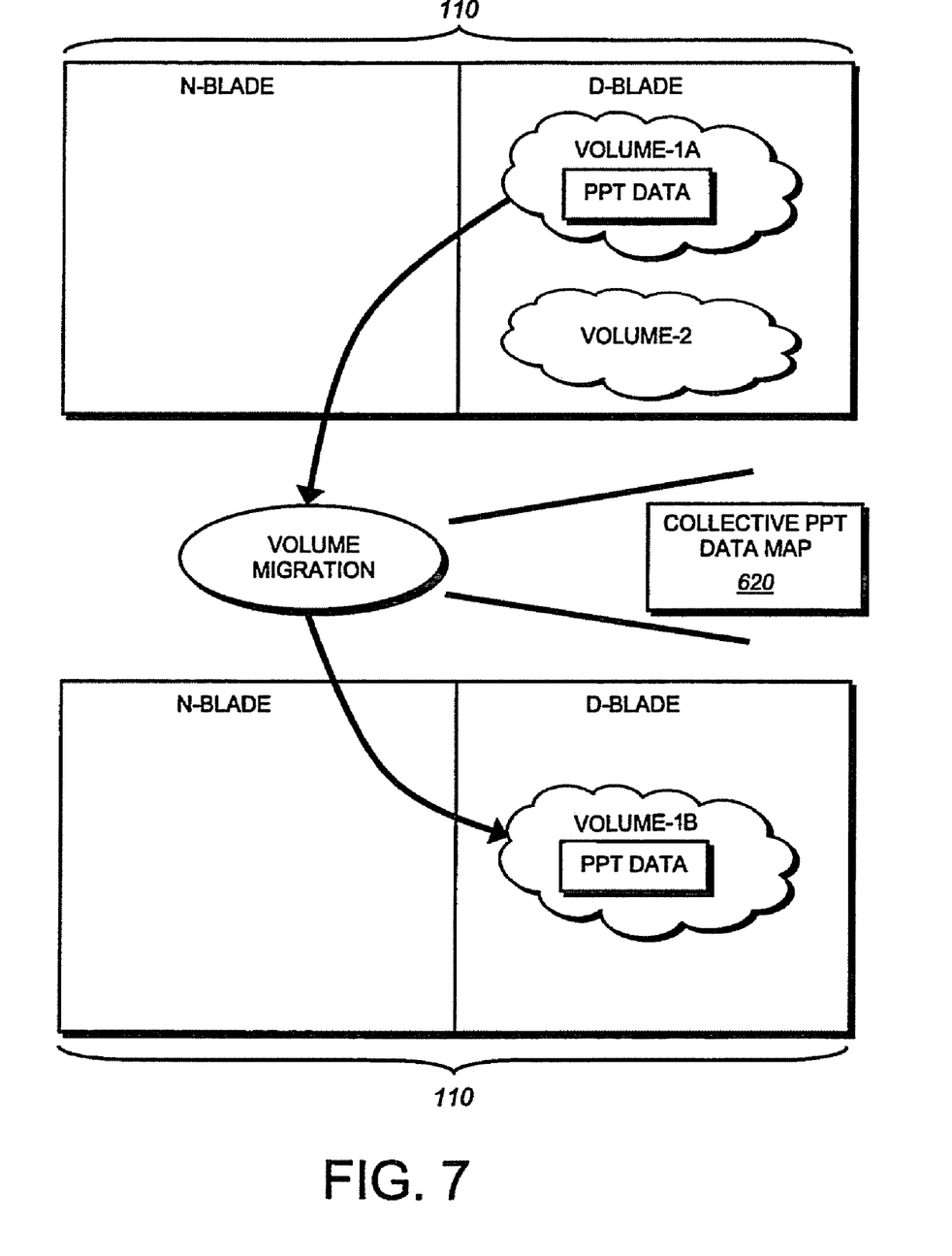
FIG. 7 is a diagram illustrating a collective PPT data map of persistent point in time data, in accordance with an embodiment of the invention.

In accordance with an embodiment of the invention, FIG. 7 is a diagram illustrating a collective PPT data map 620 of persistent point in time data. Specifically, a D-module of a source node 110 may include multiple volumes, such as volume-1A and volume-2. It should be appreciated that any number of volumes can be managed by the D-module in exemplary embodiments. By performing a volume migration of volume-1A from the source node to the destination node with the collective PPT data map 620, the high latency costs associated with transferring multiple PPT data and PPT data maps individually can be avoided. For example, volume-1B of the D-module in the destination node can be the migrated volume-1A, such that as soon as volume-1B is created, users can begin accessing data organized by volume-1B without waiting for the transfer of all PPT data of volume-1A from the source node to the destination node.

When performing a volume migration, a system administrator, or a user with administrative privileges, may determine that the source node disks 140 are over-utilized or that the node may have inadequate memory or network capacity, by examining statistics related to the performance of the source node. It should be appreciated that well-known methods of gathering such statistics are possible, such as using a network analyzer software application and the like.

Once the system administrator decides to transfer a volume, such as volume-1A from one node to another, the system administrator can use a command line interface (CLI) and/or a web-based graphical user interface (GUI) to initiate the volume migration operation. In an alternative exemplary embodiment, an automated system is capable of making a decision to transfer a volume. For example, a policy-based management system may automatically transfer volumes when a certain condition exists, such as disk space over-utilization. After initiating the volume migration operation, a volume 310 can be viewed as a set of read/write (r/w) blocks and a list of PPT data, such that each PPT data contains read-only files.

In an exemplary embodiment, the r/w portion of volume-1A is selected by the file system and transmitted to the destination node if the r/w portion is not being modified. Specifically, this can be performed by examining the volume allocation map to identify which blocks of the r/w volume are in use. The blocks in use are transferred from the source node to the destination node via, for example, the cluster switching fabric 160 (FIG. 1) to populate volume-1B. When using flexible volumes, it should be appreciated that the blocks transferred from the source node to the destination node will have the same logical identifier in the metadata, such as described in a buffer tree, but the actual physical location of the blocks used on the disks between the two nodes can differ. Alternatively, when using traditional volumes, an extra step can include mapping the blocks from the source node to the destination node such that identical physical blocks can be used.

For example, volume-1A may use four blocks of current data (not shown), such as block-B1, block-B2, block-B3, and block-B4. After the initiation of the migration of volume-1A from the source node to the destination node, a persistent point in time image includes information that block-B1, block-B2, block-B3, and block-B4 are in use. The four blocks are transferred from the source node to the destination node, such that volume-1B is populated. However, access to volume-1A continues such that by the end of the block transfers to volume-1B, block-B2 may no longer contain current data. Instead the current data may reside in block-B7.

At this point in time, access to volume-1A is suspended and the current persistent point in time data is compared with respect to block-B1, block-B2, block-B3, and block-B4. This examination leads to the discovery that block-B7 contains current data to be transferred. Accordingly, block-B7 is transferred from volume-1A to volume-1B and the identity of the destination node is replaced with the identity of the source node. It should be appreciated that access to the source node is no longer permitted after the identity transfer in order to prevent network congestion, data inconsistencies, and the like. In other exemplary embodiments, as described in relation to FIG. 8A, the identities of the nodes can be switched. Thereafter, the suspension is released and access to volume-1B begins.

While access is permitted to volume-1B, blocks identified by the collective persistent point in time data map are not used to allocate blocks in volume-1B. For example, block-B5 and block-B6 of volume-1A may be used by old persistent point in time data. Since block-B5 and block-B6 were not previously transferred, the blocks are migrated after volume-1B becomes the "live" volume for permitted access. In embodiments of the present inventions, without the collective persistent point in time data map, block-B5 and block-B6 may have been allocated during "write" operations. However, since the collective persistent point in time data map behaves as a placeholder for the blocks of volume-1A that were not previously migrated, block-B5 and block-B6 are prevented from being erroneously allocated on volume-1B during "write" operations. Thus, block-B5 and block-B6 can be safely transferred from volume-1A to volume-1B, thus preventing data inconsistencies.

Figure 8A:
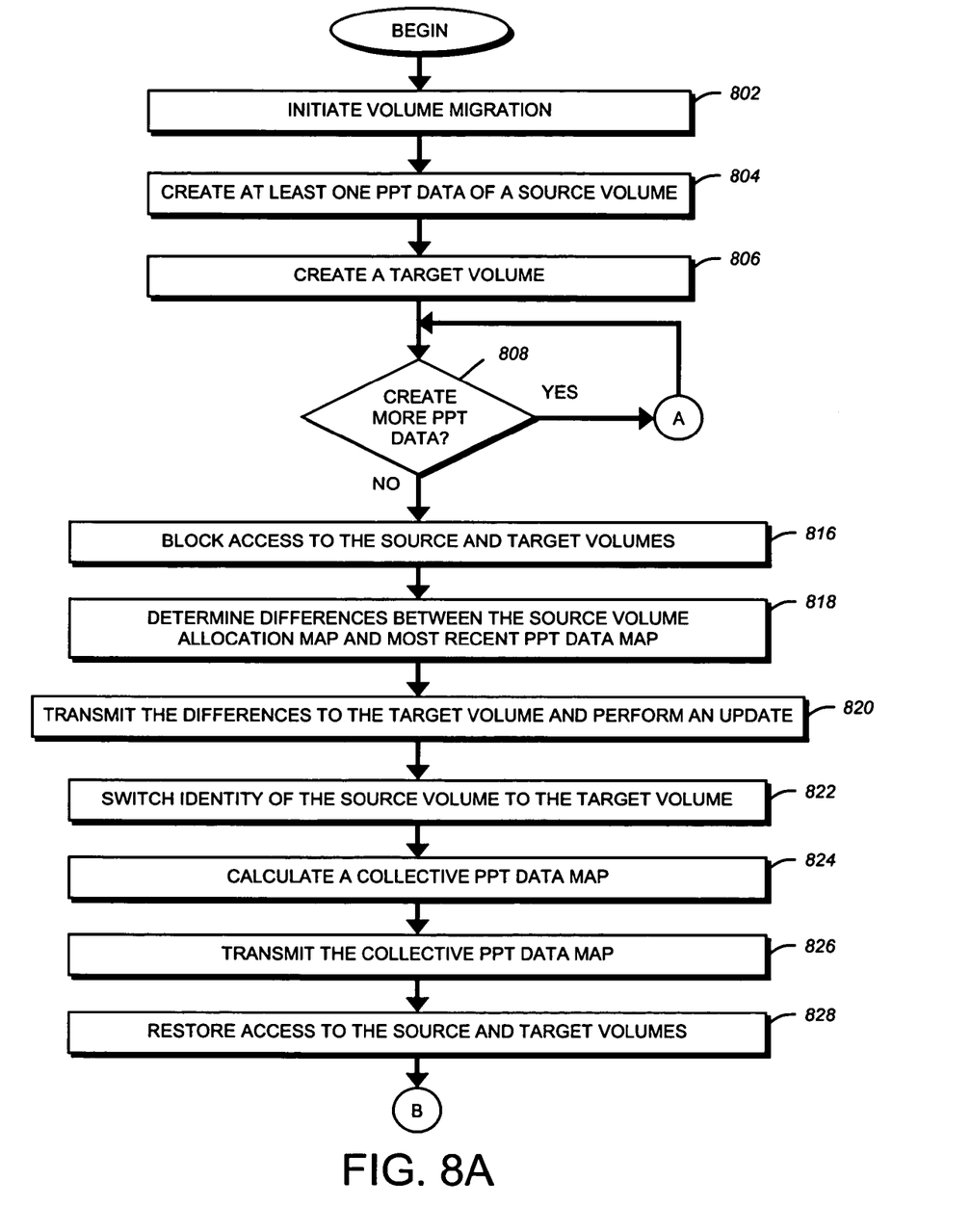
FIG. 8A is a flowchart diagram of operations for performing volume migration, in accordance with an embodiment of the invention.

FIG. 8A is a flowchart diagram of operations for performing volume migration, in accordance with an embodiment of the invention. In an exemplary embodiment, a system administrator may initiate a volume migration in operation 802. For example, the system administrator may examine statistics via a graphical management interface, command line interface, printout, or the like, and determine that a node storing a volume may be space over-utilized or may have sub-optimal performance. In an alternative embodiment, a process, such as a software process operated by the storage operating system, may examine statistics, such as disk space use, and determine that a volume migration should be performed. Thus, in operation 802, the storage operating system initiates the volume migration to transfer a volume from a source node to a target node. Then, in operation 804, the storage operating system creates at least one persistent point in time (PPT) data of a source volume of a source node. It should be appreciated that during the operation of the storage operating system, operation 804 may have already occurred before the initiation of the volume migration.

Then, in operation 806, the storage operating system of the target node creates a target volume. Specifically, volume creation on the target node is the same process as volume creation on the source node. For example, the storage operating system establishes a volume allocation map and other metadata structures, such as described with the buffer trees in reference to FIG. 5. Thereafter, in operation 808, the storage operating system of the source node may create more PPT data. If there are more PPT data, then the next operation continues to FIG. 8B. Otherwise, the next operation is to block access to the source and target volumes.

Figure 8B:
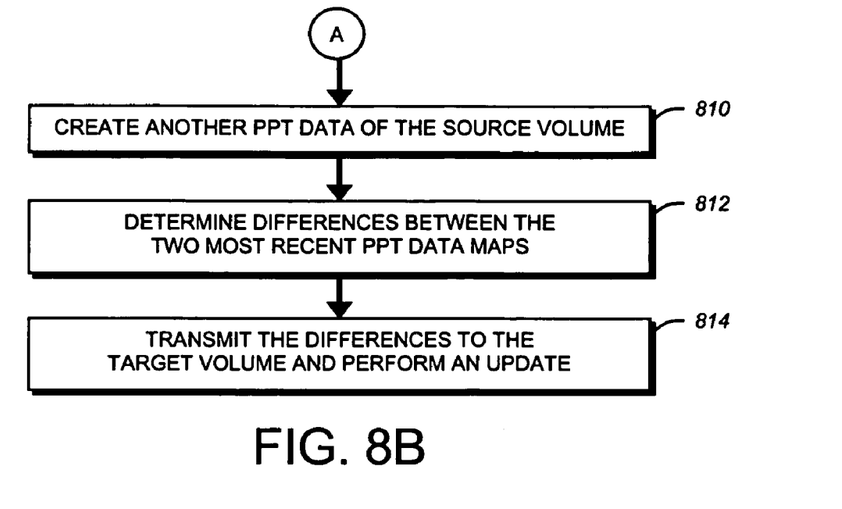
FIG. 8B is a flowchart diagram of operations for performing volume migration during the creation of PPT data, in accordance with an embodiment of the invention.

FIG. 8B is a flowchart diagram of operations for performing volume migration during the creation of PPT data, in accordance with an embodiment of the invention. Specifically, in operation 810, the storage operating system may create another PPT data of the source volume. Thereafter, in operation 812, the storage operating system determines the differences between the two most recent PPT data maps. For example, if two bitmap locations of the PPT data maps illustrate a "1," then there was no change to a block between the first and second PPT data.

In operation 814, the source volume transmits the differences between the PPT data maps to the target volume and performs an update to the target volume. Then, returning to FIG. 8A, access by users to the source and target volumes are blocked in operation 816. This quiesced period of blocked user access to the nodes occurs briefly and decreases node unavailability by the use of the collection of PPT data maps described by the collective PPT data map. During the quiesced period, softlocks, or the like, may be used to block user access to the nodes. Such softlocks, or software locks, may be for example, a boolean variable such as "mutex."

During operation 818, the storage operation system of the source node determines the differences between the source volume allocation map, which indicates the blocks in use by the source volume, and the most recent PPT data map. Then, in operation 820, the source node transmits the differences between the source volume allocation map and the most recent PPT data map to the target volume of the target node and performs an update to the target volume. Further, the r/w block contents of the volume are also transmitted from the source volume to the target volume.

Thereafter, in operation 822, the source node and the target node switch identities, which switches the identities of the source volume and target volume. The effect of switching identities is that once the quiesced period ends, user access resumes on the target volume and not the source volume. It should be appreciated that the process to switch identities includes, and is not limited to, switching node names and IP addresses if the target node will replace the source node.

However, if both the source and target nodes will remain active for user access, then addresses of a volume database (not shown) can be updated to reflect that user access to the migrated volume should occur on the target node after the volume migration. For example, in one exemplary embodiment of a cluster, an N-module communicates with a client. Each N-module of the distributed storage system can communicate with a D-module. Thus, a source volume of source D-module can be migrated to a target D-module. A distributed volume database (not shown) accessible to all N-modules contains location information of particular volumes that reside on a particular D-module. Thus, swapping identities, such as the switch described above, can be an update of entries in the distributed volume database.

In an exemplary embodiment of the present invention, the storage operating system of the source node calculates a collective PPT data map in operation 824. For example, the collective PPT data map may be created by performing a logical operation, such as a logical "OR" operation between the collection of the PPT data map contents. Thus, if in bitmap location 3×4 (row 3, column 4) of an n×n bitmap of two PPT data maps there exists a "0," then the corresponding 3×4 bitmap location of the collective PPT data map would indicate a "0." It should be appreciated that other suitable operations are possible for determining the contents of a collective PPT data map, as long as the resulting collective PPT data map indicates a representation of the collection of PPT data.

Thereafter, in operation 826, the source node transmits the collective PPT data map to the target node. Then, in operation 828, the quiesced period ends and user access is restored to the source and target volumes. Accordingly, the quiescent period is brief and exists during the processing of bitmaps, such as the creation of the collective PPT data map. At this point, users may access the source node and the target node, such as a non-migrated volume on the source node and the migrated volume on the target volume.

During the on-the-fly, real-time operation of the nodes, wherein user access is permitted, more than one PPT data may be created in operation 830 on the source node. Specifically during this non-quiesced period, the collective PPT data map is a placeholder for the upcoming PPT data transfer from the source node to the target node. By using this placeholder, new PPT data can be created continuously without accidental conflicting block allocations between the new PPT data and the source PPT data to be migrated. Further, a rule, possibly implemented as a policy, can be that during PPT data migration, a block is available for allocation on the target volume if and only if the volume allocation bitmap and the collective PPT data map indicate that the corresponding bitmap location is clear, i.e. indicates a "0." Accordingly, the rule prevents a block allocation on the target volume when a block is marked as "in use" in the collective PPT data map.

An advantage to users by using the collective PPT data map and the policy is that new PPT data can be created while transferring "old" PPT data from the source node to the target node. Thus, there is very little latency from the user perspective during the volume migration because potentially gigabytes worth of PPT data are not being migrated during the quiesced period. In alternative embodiments, not all PPT data may be migrated. For example, certain PPT data may be selected for migration, while others are retained on the source node. Alternatively, some PPT data may be deleted, thus obviating the need to migrate the deleted PPT data.

Figure 8C:
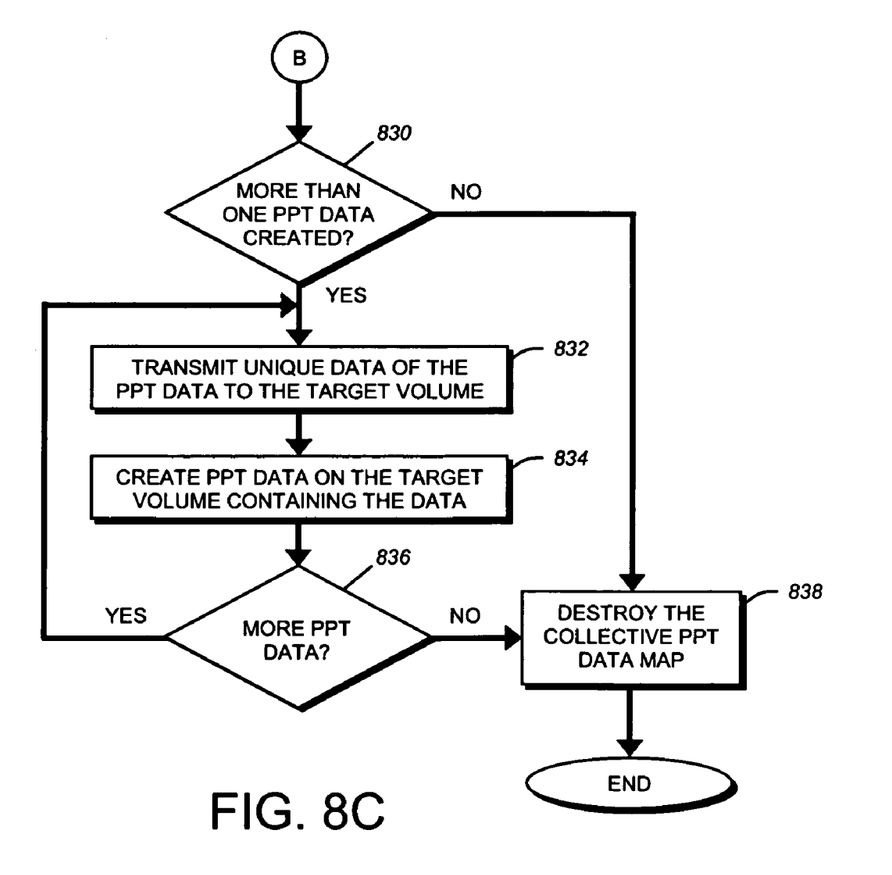
FIG. 8C is a flowchart diagram of operations for performing volume migration of PPT data, in accordance with an embodiment of the invention.

FIG. 8C is a flowchart diagram of operations for performing volume migration of PPT data, in accordance with an embodiment of the invention. If more than one PPT data was created on the source volume, then the process continues from operation 830 to operation 832. Specifically, in operation 832, the source node transmits unique data of the PPT data from the source volume to the target volume on the target node. For example, unique data can be identified by comparing the PPT data map with the collective PPT data map and identifying differing bits. In operation 834, when the target node receives the differing bitmap data, then the target node creates PPT data on the target volume containing the r/w data. If there are more PPT data to be transferred between the nodes in operation 836, then the transfer process repeats with operation 836. Otherwise, if there are no further PPT data to migrate, such as identified in operation 830, then the process ends in operation 838 by the destruction of the collective PPT data map.

The operations herein described are purely exemplary and imply no particular order. Further, the operations can be used in any sequence when appropriate and can be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives accessible via network attached storage (NAS), Storage Area Networks (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A clustered storage system environment, comprising:
a first node operatively connected to a first storage device and configured to store on the first storage device a volume comprising persistent point in time data to be migrated to a second node;
a processor operatively connected to the first node and configured to execute a storage operating system, the storage operating system configured to create a plurality of persistent point in time data maps associated with the volume, each persistent point in time data map of the plurality of persistent point in time data maps configured to identify blocks in use and not in use for the volume;
the storage operating system further configured to create a collective persistent point in time data map comprising a logical organization of the plurality of persistent point in time data maps;
the first node further configured to transmit the collective persistent point in time data map and the volume to the second node without transmitting the plurality of persistent point in time data maps;
the second node configured to store the volume and the collective persistent point in time data map on a second storage device operatively connected to the second node;
the second node further configured to receive a data request for a block of the volume on the second storage device that is marked as in use by the collective persistent point in time data map; and
the second node further configured to, in response to receiving the data request for the data block marked as in use, prevent allocation of the block.

2. The clustered storage system environment of claim 1, wherein the first node is further configured to transfer control of the volume to the second node, and further configured to transmit updated volume location information to identify a location of the transmitted volume.

3. The clustered storage system environment of claim 1, wherein the first node is further configured to transmit the volume to the second node during creation of persistent point in time data.

4. The clustered storage system environment of claim 1, wherein the first node is further configured to transmit the collective persistent point in time data map to the second node during a quiesced period.

5. The clustered storage system environment of claim 4, wherein the quiesced period is implemented by software locks to prevent access to the first node and the second node.

6. The clustered storage system environment of claim 1, wherein the second node is further configured to permit access to the volume while the volume is being transmitted from the first node to the second node.

7. The clustered storage system environment of claim 1, wherein the first node is further configured to determine differences between two most recent persistent point in time data maps of the plurality of persistent point in time data maps, and further configured to transmit the differences to the second node.

8. A method for migrating data from a source storage system to a destination storage system, comprising:
  creating a plurality of persistent point in time data maps associated with a volume comprising persistent point in time data to be migrated from the source storage system to the destination storage system, each persistent point in time data map of the plurality of persistent point in time data maps identifying blocks in use and not in use for the volume, the volume stored on a storage device operatively connected to the source storage system;
  creating at the source storage system a collective persistent point in time data map comprising a logical organization of the plurality of persistent point in time data maps;
  migrating the volume and the collective persistent point in time data map without the plurality of persistent point in time data maps from the source storage system to the destination storage system;
  storing the volume and the collective persistent point in time data map on a second storage device operatively connected to the destination storage system;
  receiving at the destination storage system a data request for a block of the volume on the second storage device that is marked as in use by the collective persistent point in time data map; and
  in response to receiving the data request for the data block marked as in use, preventing allocation of the block.

9. The method of claim 8 further comprising:
  permitting access to the volume on the source storage system while the volume is being migrated.

10. The method of claim 8, wherein the second storage device comprises at least one memory.

11. A computer-readable storage medium containing executable program instructions executed by a processor, comprising:
  program instructions that create a plurality of persistent point in time data maps associated with a volume comprising persistent point in time data to be migrated from a source node to a destination node, each persistent point in time data map of the plurality of persistent point in time data maps identifying blocks in use and not in use for the volume, the volume stored on a storage device operatively connected to the source node;
  program instructions that create at the source node a collective persistent point in time data map comprising a logical organization of the plurality of persistent point in time data maps;
  program instructions that migrate at least a portion of the volume and the collective persistent point in time data map without the plurality of persistent point in time data maps from the source node to the destination node;
  program instructions that store the portion of the volume and the collective persistent point in time data map on a second storage device of the destination node;
  program instructions that receive at the destination node a data request for a block of the volume on the second storage device that is marked as in use by the collective persistent point in time data map; and
  program instructions that, in response to receiving the data request for the data block marked as in use, prevent allocation of the block.

12. The clustered storage system environment of claim 1, wherein only a portion of the persistent point in time data associated with the collective persistent point in time data map is selected for transmission.

13. The clustered storage system environment of claim 1, wherein the first node is further configured to determine if more than one persistent point in time data was created on the volume.

14. The clustered storage system environment of claim 1, wherein the first node is further configured to compare at least one persistent point in time data map with the collective persistent point in time data map to identify unique data.

15. The clustered storage system environment of claim 14 further comprising:
  the first node further configured to transmit the unique data to the second node; and
  the second node further configured to create a-persistent point in time data associated with the unique data.

16. The clustered storage system environment of claim 1, wherein the first node is further configured to determine that no additional persistent point in time data is to be migrated, and further configured to delete, in response to the determination, the collective persistent point in time data map.

17. The clustered storage system environment of claim 1, wherein at least one of the first and second storage device comprises a disk.

18. The method of claim 8, wherein creating the collective persistent point in time data map comprises performing a logical operating between the plurality of persistent point in time data maps.

19. The method of claim 8, further comprising transmitting the collective persistent point in time data map to the destination storage system during a quiesced period.

20. The method of claim 8, further comprising permitting access to data of the volume on the destination storage system while the volume is being migrated.

21. The method of claim 8, further comprising:
  comparing at least one persistent point in time data map with the collective persistent point in time data map to identify unique data; and
  transmitting the unique data to the destination storage system.

22. The method of claim 8, wherein at least one of the first and second storage device comprises a disk.

* * * * *